(12) United States Patent
Karszes et al.

(10) Patent No.: US 6,760,021 B1
(45) Date of Patent: Jul. 6, 2004

(54) MULTI-DIMENSIONAL IMAGE SYSTEM FOR DIGITAL IMAGE INPUT AND OUTPUT

(75) Inventors: William M. Karszes, Rosewell, GA (US); Jerry C. Nims, Atlanta, GA (US); Paul F. Peters, Suwanee, GA (US)

(73) Assignee: Orasee Corp., Duluth, GA (US)

( * ) Notice: Subject to any disclaimer, the term of this patent is extended or adjusted under 35 U.S.C. 154(b) by 0 days.

(21) Appl. No.: 09/616,070

(22) Filed: Jul. 13, 2000

(51) Int. Cl.⁷ .............................................. G06T 17/00
(52) U.S. Cl. ...................................... 345/419; 382/154
(58) Field of Search ................................ 345/419, 421, 345/422; 382/154, 100

(56) References Cited

U.S. PATENT DOCUMENTS

| | | | |
|---|---|---|---|
| 4,925,294 A | | 5/1990 | Geshwind et al. |
| 5,764,231 A | * | 6/1998 | Ray et al. .................... 345/419 |
| 5,777,588 A | * | 7/1998 | Woodgate et al. ............. 345/6 |
| 5,864,343 A | | 1/1999 | Naughton et al. |
| 5,926,288 A | * | 7/1999 | Dellert et al. ............... 358/487 |
| 5,953,013 A | | 9/1999 | Shimizu |
| 5,973,700 A | * | 10/1999 | Taylor et al. ................ 345/427 |
| 5,974,401 A | * | 10/1999 | Enomoto et al. ............. 705/40 |
| 5,977,979 A | | 11/1999 | Clough et al. |
| 5,986,662 A | | 11/1999 | Argiro et al. |
| 5,995,650 A | | 11/1999 | Migdal et al. |
| 6,018,349 A | | 1/2000 | Szeliski et al. |
| 6,026,215 A | | 2/2000 | Fantone et al. |

* cited by examiner

*Primary Examiner*—Cliff N. Vo
(74) *Attorney, Agent, or Firm*—Patton Boggs LLP (57) ABSTRACT

A two-dimensional image file is transferred from a client via the Internet or other data transfer network to a server having a processor for performing selectable image data processing, according to a stored program. The processor generates a file for output, formatting and fixation on a micro-optical material. The image fixed on the micro-optical material is seen by the unaided eye as three dimensional, or an action, zoom, flip, or morphing sequence, depending on the image processing selected. For three-dimensional imaging the processor assigns regions within the image to different image surfaces, and displaces each according to multiple viewing angles. The image surfaces are interphased into a single data file which is output and fixed, by printing or photographic processes, on the micro-optical material. The printed image is either printed directly on the micro-optical material or laminated. The image may also be viewed through a CRT having an overlaid micro-optical material.

11 Claims, 8 Drawing Sheets

MULTI-DIMENSIONAL IMAGE SYSTEM FOR DIGITAL IMAGE INPUT AND OUTPUT

FIELD OF THE INVENTION

This invention relates generally to a Internet and other network-based image processing and display system and, more particularly, to a method and apparatus for inputting two-dimensional images, converting the image to a three dimensional or sequential view image file with user selectable image parameters and outputting the file on a user selectable display or printer unit.

DESCRIPTION OF THE RELATED ART

Various methods and apparatus for forming an image that appears to have three dimensions when viewed are known in the art. The term "three dimensions," for purposes of this description, is for the image of an object, or arrangement of objects, to have an appearance of height, width and depth. This contrasts with conventional photographs and unmodified digital format conversions of the same, which display the dimensions of height and width but, for reasons including lack of parallax, do not display a true image of depth.

There are at least two known methods for arranging and re-formatting two-dimensional photographic images, or pluralities thereof, onto a flat medium that when viewed create an impression of depth. One is commonly known as the "3-d glasses" method. In its simplest form, a scene is photographed with two cameras, one corresponding to a person's left eye and one corresponding to a person's right eye. The developed pictures, or sequence of pictures for a movie, taken by the two cameras are then projected, one image atop the other, onto a flat screen through two respective projector lenses. The projector lenses apply a different color or polarization to the left and right image, with respect to one another, before overlaying them on the viewing screen. The viewer then wears special glasses that filter, by color or polarization, the overlaid images such that his or her left eye sees only the image from the "left eye" camera, while his or her right eye sees only the image from the right eye camera. Because of the parallax between the image seen by the left eye and right eye, the viewer senses an apparent depth, i.e., three dimensions.

There are, however, problems with the "3d glasses" method. One problem is that the viewer must wear the special glasses. Another is that many viewers become nauseated due to visual distortions when viewing the picture.

A second known method for transforming a two dimensional photograph onto a different medium which displays it to have apparent depth is the lenticular lens method. The lenticular lens method interlaces Q different images or Q viewing angles of a single image, using a raster type interlacing, and then places a sheet formed of a plurality of elongated strip lenses, or lenticules, over the raster image. The overlay is such that each lenticule or lens overlays Q raster lines. The lenticules are formed such that one image is presented to the viewer's left eye and another image is presented to the viewer's right eye. The difference between the left image and the right image approximates the parallax that the viewer would have experienced if viewing the original image in person.

The optical principles of lenticular screen imaging are well known to one of ordinary skill in the relevant art. However, referring to FIGS. 1A and 1B, the principles of operation will be described.

Figures 1A, 1B:
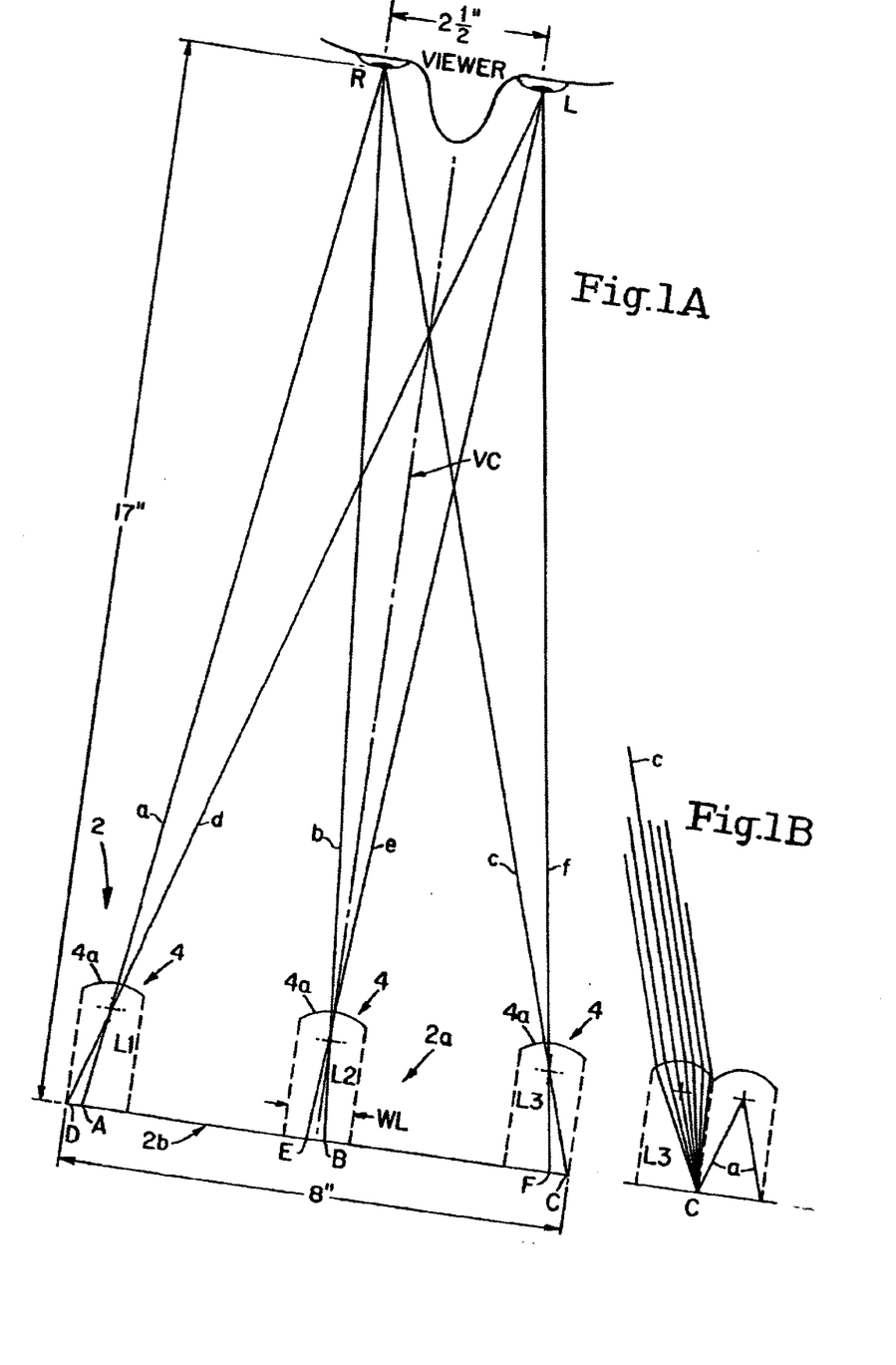
FIG. 1A is a related art diagram of a lenticular screen overlaying a plurality of raster lines of an interlaced image, and the approximate optical ray paths through the corresponding cylindrical lenses.
FIG. 1B is a related art diagram of the optical ray paths through a cylindrical lens.

Referring to FIG. 1A, a lenticular plastic 2 consists of clear plastic containing a vertical overlay of N cylindrical lenses 4, commonly referred to as "lenticules", on the front surface 2a of the plastic. These lenses 4 image light in one direction and are historically designed with their focal points on the back plane 2b of the plastic. The focal plane of each cylindrical lens 4 is measured from the apex 4a of the single refractive surface and is consequently equal to the overall thickness of the plastic sheet 2. FIG. 1A also shows a top view of a typical viewing situation of a person (not numbered) looking at the plastic sheet 2 through his or right eye R and his or her left eye L. It is assumed for this example that the viewer has the average inter-pupil distance, which is 2.5 inches.

As shown in FIG. 1A, the viewer looks at an image at the vertical centerline VC. For ease of understanding only three of the N lenticules 4 are shown, and each is depicted with a significantly enlarged scale. As shown in FIG. 1A, three rays of light, labeled as a, b, and c, radiate from points under the lenticular sheet 2 labeled A, B, and C, respectively. Point A is under lenticule L1, point B is under lenticule L2 and point C is under lenticule L3. Each of the three rays of light a, b, and c pass through the center of curvature of its respective lenticule L1, L2 and L3 and travels to the right pupil R of the viewer.

The light rays a, b and c are straight lines because they each emerge normal to the cylindrical surface 4a of their respective lenticules and, therefore, are not refracted. Further, as shown at FIG. 1B, each of the light rays emerging from point C other than the center ray c will emerge from the lenticule L3 parallel to c. The off-center rays are parallel to c due to their respective angle of refraction at the L3a surface. Therefore, all rays from points A, B and C will emerge parallel to a, b, and c. In other words, points A, B and C are imaged into infinity since they lie in the focal plane of the three lenticules.

The viewer's left eye will see points D, E, and F, by way of rays d, e, and f passing through center of the respective center of curvature of the lenticules L1, L2, and L3. As shown at FIG. 1A, the points D, E, and F are displaced horizontally on the surface 2b with respect to the points A, B and C.

All of the remaining lenticules (not shown) have a pair of points such as A and D of lenticule L1, one being visible by the viewer's right eye and the other being visible by the viewer's left eye.

Referring to FIG. 1A, the lenticules L1, L2 and L3 are shown in cross-section. Seen from a front view (not shown) each of the N lenticules extends a vertical length equal to the height of the screen 2. The points A and D of FIG. 1A extend the same length along a narrow width. Therefore, each lenticule covers two thin vertical areas, one being visible by the viewer's right eye and the other being visible by the viewer's left eye.

When the analysis of lenticules L1, L2 and L3 is expanded to include all N lenticules of the viewed sheet 2, it can be seen that the viewer's left eye sees one set of N vertical fine areas, one behind each lenticule, with his right eye, and a different set of N vertical fine areas with his left eye. As described above, the left and right vertical fine areas under each lenticule are horizontally displaced with respect to one another.

Referring to FIG. 1B the width of each of the vertical fine areas is a function of the acceptance angle, and the angle subtended by the viewer's pupil. This width is normally a small fraction of the width WL of the lenticule.

An example of the width of the vertical line areas is as follows:

Assume a lenticular sheet with an acceptance angle of 32 degrees and a viewer with 1/8" pupils located 17 inches from the sheet, as shown in FIG. 1A. From any given in the sheet, the viewer's pupil subtends an angle of arctan (0.125/17), which equals approximately 0.42 degrees. Hence, for this example, the viewer sees a line behind each lenticule which is 0.42/32, or 1.3% of the lenticule width.

Thus, if an image is converted into N vertical raster lines, placing one behind each of the lenticules L1, L2 and L3, centered on points A, B, and C, respectively, and each of the remaining N-3 lines on an appropriate vertical line behind each of the remaining lenticules, the image would be visible only through the viewer's right eye. Similarly, if a second image is converted into N vertical raster lines, with one placed under each lenticule at locations corresponding to points D, E, and F, for lenticules L1, L2 and L3, that image would be visible only to the viewer's left eye.

If the first and second images are a stereo pair, the first representing a scene viewed from the left eye, and the second representing the scene viewed from the right eye, the viewer perceives the same parallax as experienced by an actual viewer's eyes. However, if only two vertical thin areas are under each of the lenticules, this three-dimensional effect is obtained only when the viewer is at the position depicted by FIG. 1A. The reason is that if the viewer is displaced in a horizontal direction, i.e., lateral with respect to the centerline VC, then the left eye will not see one of the images simultaneous with the right eye seeing the other. For this reason, typically four or more 2D frames, or views, are recorded under the plastic sheet 2, with a corresponding four or more vertical raster lines behind each lenticule. The four 2D frames, and associated raster lines of each, are positioned such that the viewer has four acceptable viewing angles. At the first angle the viewer would see images 1 and 2. Images 1 and 2 would a first stereo pair. At a second viewing angle the viewer's right eye would see image 2 and his left eye would see image 3. Images 2 and 3 would be another stereo pair of the original scene, in other words two views of the original image having the same parallax with respect to one another as images 1 and 2. Similarly, at a third viewing angle the viewer would see pictures 3 and 4. The optimum number of pictures or frames is easily computed as follows, using FIG. 1A as an example:

The viewer's eyes subtend an angle of arctan (2.5/17) which equals approximately 8 degrees. Using lenticular material with an acceptance angle of 32 degrees, 32/8 or four frames are seen to be a minimum. At this value the viewer's eyes would see the center of adjacent image strips. More frames can be recorded, but trade-offs such as sharpness versus roundness are involved.

The four-frame example above described the image pairs 1 and 2, 2 and 3, 3 and 4, and 1 and 4, which at the designated viewing angles are seen by the right eye and left eye, respectively, as stereo pairs of the same original image. As known in the art, other image effects are possible with lenticular screens. One of the is "flip imaging" in which, for example, image pair 1 and 2 which the viewer would see from a first viewing angle, are a stereo pair of a first image such as, for example, an airplane with its landing gear retracted. Image pair 3 and 4, which the viewer would see from a second viewing angle, could be an image of the airplane with its landing gear out. Another effect is "action" in which a sequence of two or more images is seen as the viewer moves through a corresponding sequence of viewing angle. An example "action" is a baseball pitcher moving his arm. Another effect is "morphing" in which a sequence of two or more images is seen as the viewer moves through a corresponding sequence of viewing angles. The image sequence portrayed is a staged change in the scene, or in one or more objects or characters in the scene.

The current techniques and related apparatus for transferring a two-dimensional image into a lenticular screen format require considerable time by skilled persons, involving a substantial amount of trial and error, and result in an image far below what is termed "photographic quality." More particularly, producing a multi-dimensional lenticular image from a series of 2D image frames always involves the process of "line-forming", i.e., to slice each 2D frame sequentially into a series of n thin lines, equally spaced for recording behind each of n lenticules.

Presently there are two techniques utilized to produce line formed lenticular imagery:

1. Line formed from photographic interlacing;
2. Line formed from interlacing computer programs used by specialists in lenticular graphic arts.

Photographic Interlacing

In photographic techniques either the client must provide a specialist with multiple negatives or multiple negatives must be reduced from existing digital files. The word "specialist" is used because the level of skill and experience required to carry out the photographic interlacing is very high. There are a very small number of such specialists known in the art. A brief summary of the photographic interlacing operation, as presently practiced in the art, is as follows:

Exposure of each different photographic negative through the lenticular screen produces a line formed image. Exposure onto photographic lenticule (emulsion coated directly onto the rear surface of the lenticular sheet) will produce a single unique image. Exposing each frame sequentially through the front of the lenticular produces a "fuzzy" master when the lenticular is held in intimate contact with a photographic transparency material. After exposing the sequence of images, the positive can be digitized to produce files for graphic art reproduction in any number of formats such lithography, digital printing, etc.

Specialized equipment is required to produce photographic imagery. The cost and time required is dependent on the number of images, availability of equipment and materials and the skill of the technician producing the image.

Computer Generated Image Processing

Computer image processing requires the image to be in a digital form. Therefore, as a first step, if the image is in a photographic form it must be digitized. This can be done by the client or by the specialist. Next, the digital format must be transported to a specialist who reformats it into multiple images. These multiple images are then line formed, by a specialist, into a form suitable for affixing to a MOM to present as a multi-dimensional image.

However, there is no system known in the prior art for readily converting, by or under the command of an unskilled person without specialized equipment, a two-dimensional image into a three dimensional lenticular image, regardless of image quality. More specifically, there is no known system that allows an ordinary consumer to input a two-dimensional image and, without a significant amount of skilled effort and costly equipment, obtain a reasonable quality lenticular 3D product.

SUMMARY OF THE INVENTION

An object of the present invention is to provide a system and method for inputting a two-dimensional image, either a data file or a scanned photograph, into an Internet access terminal, such as a personal computer, transferring the file over the Internet to a server having a 2D-to-3D or other image transformation method programmed into memory, performing the 2D-to-3D or other image processing, then transferring the 3D or other file to a user-designated output device for fixation on a micro-optical material which, when viewed by the generation as a photographic quality lenticular 3D or other image.

A further object of the present invention is to provide a system and method for transferring a 2D file over the Internet, generating a sequence of image files representing a changing, or morphing, of one or more objects in the image, and then transferring the morph file to a user designated output device for fixation on a MOM media. When the MOM is rotated with respect to the plane of the viewer's eyes, the viewer sees a morphing image.

A still further object of the invention is to provide a system and method for receiving one or more 2D image files over the Internet and transforming the received files into a set of discrete or "flip" images, for output to, and fixation on a MOM medium.

Another object of the invention is to provide a system and method for receiving one or more 2D image files over the Internet and transforming the received files into a sequential set of "action" images, for output to, and fixation on a MOM medium. An example of an "action" image is a baseball pitcher, with a sequence of images corresponding to the pitcher's arm while pitching a baseball.

A further object is to provide a system and method for transferring interphased image files generated, for example, by the system and method of the previous embodiments, to a cathode ray tube (CRT) having an overlaid MOM screen. In an example embodiment the CRT may be local to a client. Further, the image files may be stored, in either 2D or interphased 3D form, in an archival storage accessible to the client by, for example, the Internet.

One example embodiment of a system of this invention meeting these and other objectives comprises a home computer having Internet or other network access to a remote server, a server having data processing and storage capability or resources, and a printer or other output device accessible by the server, either local to the user, local to the server, or at another location. The server stores a 2D-to-3D image processing program for controlling its processor to perform the described steps. An example embodiment of the inventive method on this system is as follows:

a. The user/client enters or downloads a two-dimensional image file into his or her personal computer, or set-top Internet access unit. The file can be in any image formats such as, for example, JPEG or Adobe® ".pds", ".eps" or the like. The file may be compressed, using any of the techniques known to one of skill in the art.
   b. The user accesses a web site, or the like, posted by an image services provider, clicks on an "upload 2D file" button or the like, and the file is automatically transferred over the Internet to a server designated by the image services provider, using any of several known transmission media including, but not limited to 56 Kbit/sec modem, ISDN, DSL, T1, T2, T3 or cable modem.
   c. In response to prompts, or other graphical user interface requests for input appearing on the user's display, the user enters commands, via a key pad, mouse, or touch-screen, into a graphical user interface area of the screen to designate a object as the Key Subject. The user may also identify other objects as foreground or background.
   d. a program resident on, or accessible from, the server arranges, or increments, different segments or objects, or portions of objects within the two-dimensional image onto respective surfaces, one being a key object surface, the first being the foreground surface, and the last plane being the background surface.

In the above step (d) each surface corresponds to points within the original two dimensional image which, from the perspective of a person actually observing the three-dimensional scene represented by that image, would be at the same distance from that observer. The number of surfaces is selectable.

Next, the system of this example performs the following steps:
   e. A number of viewing angles is selected and then, for each viewing angle, a parallax or image shift for each object within each surface is calculated.
   f. For each viewing angle, a parallax or image shift based on the results of step (e) is applied to all objects, the amount of shift depending on which surface the object is on relative to the key subject, and the amount of depth between surfaces.
   g. A line file corresponding to each viewing angle is generated, each line file representing an image of all objects as seen from that viewing angle, the number of lines corresponding to the number of cylindrical lenses in a MOM sheet.
   h. The line files generated by step (g) are interphased into a single line form file.
   i. The line formed file is printed on directly on a MOM, printed on paper which is then overlaid with a MOM, photographically applied to a MOM, or displayed on a cathode ray tube (CRT) having a MOM overlay.

A further embodiment of the invention receives, from the client over the Internet, a sequence of two-dimensional images representing morphing of an object, an action, a flip or a zoom sequence. The sequence of images is interphased into a merged file. For a morph image the sequence of files represents a progressive change in the shape or form of an object. The interphased or merged file is printed or photographically exposed on a MOM. When viewed through the MOM at a succession of viewing angles, presents a corresponding sequence of visual images. Similarly, for action, flip and zoom the MOM, which when viewed through the MOM at a succession of viewing angles, presents a corresponding sequence of visual images appearing as action of an object, a flip between objects or scenes, or a zoom-in or zoom-out from an object.

BRIEF DESCRIPTION OF THE DRAWINGS

The foregoing and other objects, aspects, and advantages will be better understood from the following description of preferred embodiments of the invention with reference to the drawings, in which.

DETAILED DESCRIPTION OF THE EMBODIMENTS

Figure 2:
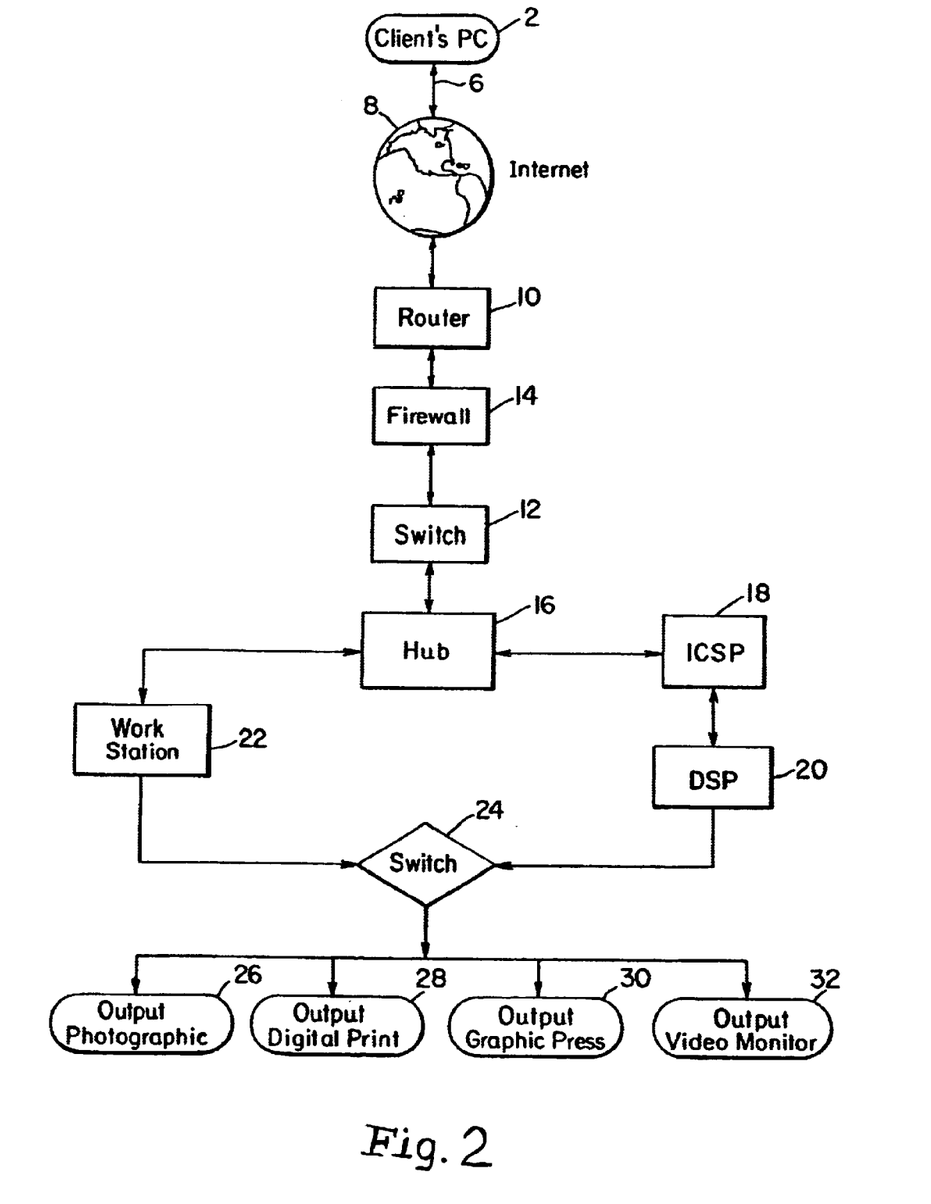
FIG. 2 is a high level diagram of an example system according to the present invention.

Referring to FIG. 2, a first example embodiment of the system of this invention will be described. The FIG. 2 example system comprises an input terminal 2, such as a Pentium or PowerPC based personal computer, or a set-top Internet access unit. The terminal 2 runs under any one of the commercially available operating systems such as, for example Windows®, Apple® or Macintosh® OS, or Linux. The method by which the two-dimensional file is input into, or created by the user terminal 2 is not particular to the invention. For example, the two-dimensional file can be an e-mail attachment (not shown) sent over a network such as the Internet to the terminal 2, or may be downloaded using a browser (not shown) associated with the terminal 2, or may be created within the terminal 2. Alternatively, the input terminal 2 may have a scanner (not shown), for receiving and digitizing photographs and slides. Further, the terminal may have a DVD or other format of CD ROM drive (not shown) for receiving digital image files. The file format can be JPEG, TIFF, Adobe® ".eps" or one of many other known formats representing photographs and graphics files.

The input terminal 2 connects over a transmission line 6 to the Internet or other wide area network 8.

As is known to one of skill in the art, there are a plurality of interface systems, methods and technologies for connecting the input terminal 2 to the Internet 8. The particular interface method that is used is not particular to this invention except, as is known to one or skill in the art, images typically entail large files. Therefore a general consideration is that the higher the transmission rate the less time it will take to upload and download information between the input terminal 2 and the Internet 8. Accordingly, if the user desires to use a high rate interconnect numerous options exist, including cable modem (not shown) and a satellite-based download system (not shown) such as Hughes DirecPC®. In addition, video compression could be employed if higher transfer rates were desired. There are many known video compression algorithms and a large variety of commercially available software packages for implementing the same. The use and availability of these are well known to persons of ordinary skill in the art.

Included in the FIG. 2 transmission line 6 is an access (not shown) to the Internet 8, which may be through an Internet Service Provider (ISP), such as America On Line®. The protocol and format of data transmissions through the Internet 8 may, for example, be the Transmission Control Protocol/Internet Protocol (TCP/IP) family of protocols, which are well known.

The system of FIG. 2 further includes a network hub 10, which is connected to the Internet 8 by way of a switch 12, a firewall 14, and a router 16. The FIG. 2 system also comprises an image conversion services provider (ICSP) 18, connected to the hub 10, the ICSP having a digital signal processor, or DSP, 20 as a connected resource. As depicted, the FIG. 2 system further comprises a workstation 22 connected to the hub 10. The workstation 22 and the DSP unit 20 are connected to switch 24, the output of the switch 24 feeding a plurality of output resources, including a photographic output 26, a digital print output 28, a graphic press 30 and a video monitor 32.

The FIG. 2 system is depicted according to example functional blocks, which may be implemented in various hardware configurations, and is not representative of the actual hardware arrangement of the system. For example, the functions of the workstation 22, the ICSP server or web site host 18 and the DSP 20 could all be carried out by a single Pentium III or equivalent workstation. In addition, the functions of the hub 10, the ICSP server 18, DSP 20 and workstation 22 could be implemented on a much larger network of servers (not shown) and workstations (not numbered), interconnected via a large capacity network within a large institution (not shown). Still further, the ICSP server 18, the DSP unit 20 and the workstation 22 could be located remote from one another, connected via the Internet 8, instead of through the hub 10, or by a proprietary intranet (not shown).

Figure 3:
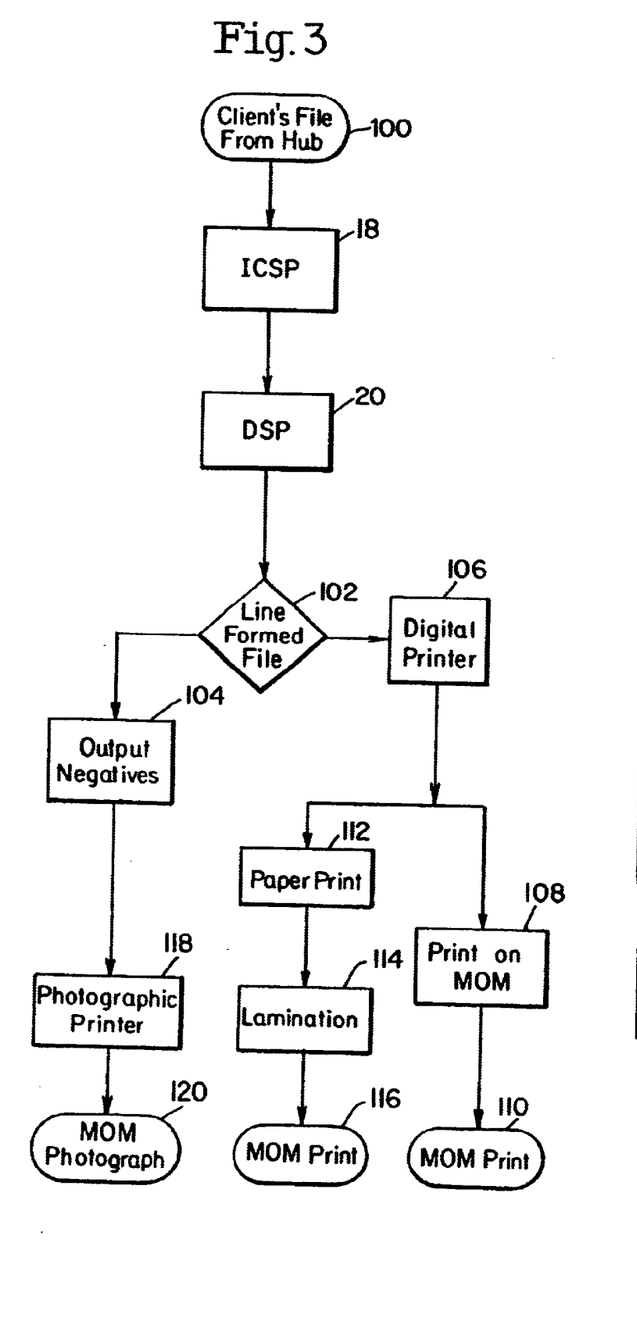
FIG. 3 is a more detailed functional block diagram of a system according to FIG. 3.
Figure 4:
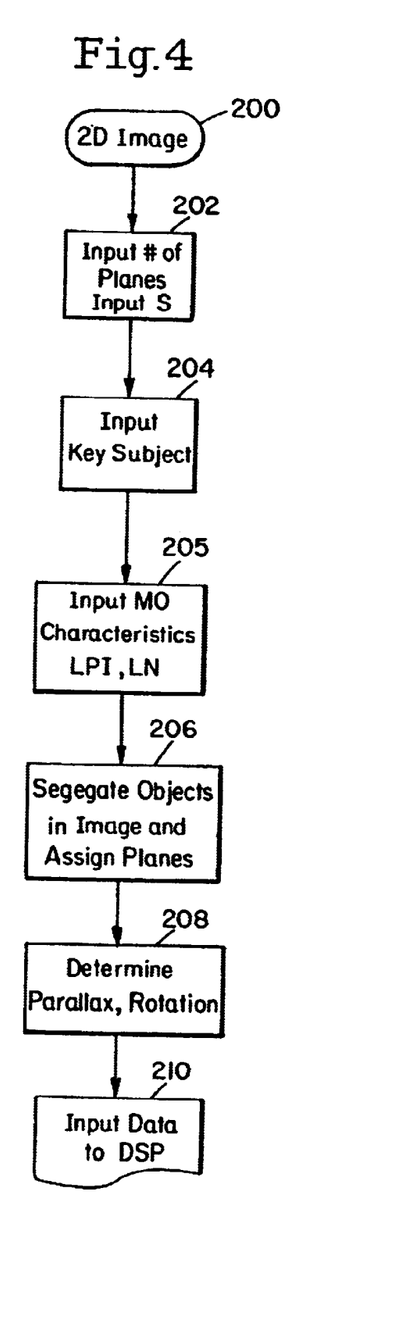
FIG. 4 is a block flow diagram of an example method for receiving a two dimensional file, selecting surfaces, segregating objects, and applying parallax shift.

Resident on or accessible by the DSP unit 20 is software (not numbered) for carrying out the processing steps described in reference to the example operation described in reference to FIGS. 3 and 4.

FIG. 3 is an abstracted drawing of system in accordance with FIG. 2, with like-functions labeled with like numbers. Referring to FIGS. 2–4 a first example operation of one embodiment of the invention will be described.

Block 100 of FIG. 3 represents a two-dimensional image file, referenced as 2DFILE. Method step 200 of FIG. 4 depicts a client uploading the 2DFILE to the Image Conversion Services Provider (ICSP) 18 of FIG. 2, which is shown on the abstracted system diagram of FIG. 3.

The particular upload method of step 100 is a design choice. Various upload methods are known to persons of ordinary skill in the data communications arts. For example, a web site (not shown) associated with the ICSP 18 may be hosted within the ICSP server 18 or within another server (not shown) connected to the Internet 8.

If an ICSP web site is used it may, for example, have an upload or equivalent button or hot link (not shown) which the user interfaces with, and views on the user's screen (not shown) by way of a typical browser, such as Internet Explorer®. An example operation of an upload button is the invocation of a Java or equivalent script stored, for example, in the ICSP server 18. The Java script may then invoke, or display, a file selector box (not shown) on the user's screen, together with a complete upload or equivalent button. In response, the user/client inserts the file name, e.g., 2DFILE, into the file selector box and clicks an upload button. The upload button then invokes another Java script file transfer function. For this example the transfer destination may be a folder within the ICSP server 18.

It should be noted that the above-described transfer operation is for purposes of example only. Many variations are apparent to one of skill in the art. For example, instead of a Java script invoking a file selector box, a default transfer name could be used, i.e., clicking on the upload button would automatically upload any image file located in a default folder on the user terminal 2.

The means by which the 2DFILE is loaded into the client's terminal 2 is not particular to this invention. The 2DFile could, for example, be downloaded from the Internet, scanned, or could be read from a compact disc (CD ROM) (not shown). The file format for the 2DFILE is also not particular to the invention. Example formats include, but are not limited to, TIFF, JPEG or Adobe® ".pds", or ".eps".

Referring to FIG. 4, at step 202 the ICSP server 18 receives the number S, representing the number of image surfaces SIMG (s), for s=1 to S, on which the objects or portions or regions thereof are to be arranged, as will be described below. Next, at step 204, the ICSP server 18 receives a key subject data KS, designating which of the image objects is to be the key subject. As will be understood from the FIG. 5 description below, the object or region within the 2DFILE designated as the key subject is an image focal point, in a depth direction, of the three dimensional image produced by the invention. Next, at step 205, the ICSP server 18 receives an LN and LPI data which represent, respectively, the total number of lenses and the number of lenses per inch of the final MOM on which an image will be fixed on or displayed through.

The means by which the ICSP 18 receives S, KS, LN and LPI are a design choice. For example, the ICSP 18 may receive the S parameter and the KS data at steps 202 and 204 by way of the user's browser (not shown) interfacing with the web site hosted by the ICSP.

Referring to FIG. 4, after receiving the S value representing the number of image surfaces SIMG(s), and the key subject identifier KS, the ICSP server 18 proceeds to step 206 and identifies and segregates all of the objects or regions within the image represented by the 2DFILE. The step 206 identification may be performed, for example, by one of several commercially available software programs for image object segregation. These include Adobe® Polygon Elasso™, Magnetic Lasso™, and Lasso Tool™, which programs that segregate objects using threshold by luminance and threshold by color.

Each of the objects identified and segregated by step 206 is designated Object(n), for n=1 to N, where N is the number of identified objects.

Step 206 also receives commands, from the FIG. 2 workstation 22, assigning each Object(n) to a corresponding image surface SIMG(s). For purposes of this description, SIMG(1) is the foreground, and the surface SIMG (S) is the background of the image. Therefore, each Object(n) that the user desires to be in the far background of the final three-dimensional image is placed on SIMG(S). Similarly, each Object(n) that the user desires to be in the near foreground of the final three-dimensional image is placed on surface SIMG(1). The key subject, Object(KS), is placed on the key subject plane, SIMG(KS). Remaining Objects (n) are placed on surfaces SIMG(s) between the foreground surface SIMG (1) and the key subject surface SIMG(KS), or between that key subject surface and the far background surface SIMG (S).

As will be understood, multiple objects can be placed on the same image surface SIMG(s). In addition, it is not absolutely necessary that each image surface SIMG(s) have an Object(n) assigned to it. The minimum and maximum number of surfaces S is constrained by LPI, the number of lenses per inch of the MOM on which the processed image is to be affixed. For example, for LPI=40 the minimum number S of surfaces is four and the maximum is equal to seven. The physics on which the maximum and minimum is based can be understood, by ones skilled in the relevant arts of optics, from related art FIGS. 1A and 1B.

Referring to FIG. 4, the process next proceeds to step 208 where it determines the parallax, or rotation, between each left eye image of the 2DFILE and each right eye image of the 2DFILE, for each Object(n) associated with each of the S image surfaces SIMG(s). The determination of parallax or rotation will be described in reference to the example shown in FIG. 5.

Figure 5:
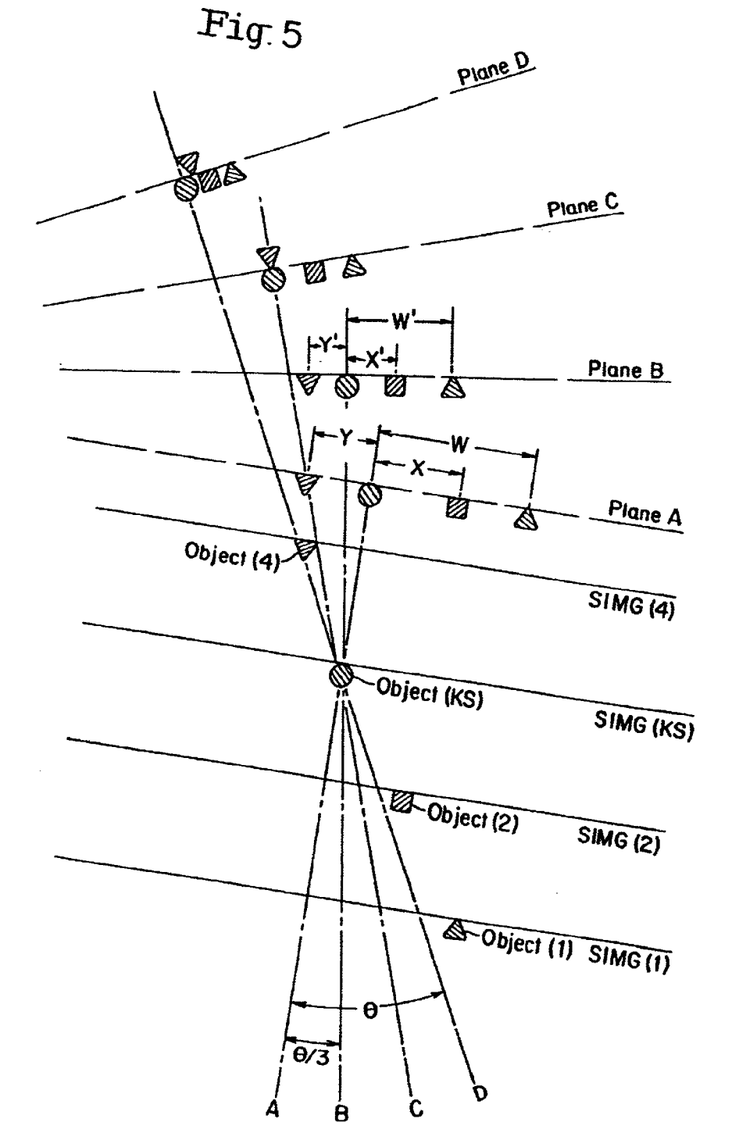
FIG. 5 is a graphical representation of the parallax determination with the method of FIG. 4.

For the FIG. 5 example, S, the number of surfaces SIMG(s), is equal to four. The number N of Objects(n) is also equal to four. For simplicity, Object(1) is placed on surface SIMG(1), Object(2) on surface SIMG(2), the key subject Object(KS) is placed on surface SIMG(KS), and Object(4) is placed on SIMG(4). The FIG. 5 example calculates a horizontal shift for each Object(n), for each of four views, labeled A, B, C, and D. The FIG. 5 example assumes four views for reasons described previously in reference to FIGS. 1A and 1B. More specifically, the FIG. View A corresponds to the image seen by the viewer's left eye at a first viewing position, and View B corresponds to the image seen by the viewer's right eye from that same first viewing position. The angular displacement, or parallax, between View A and View B is θ/3 degrees. Similarly, View C is rotated θ/3 with respect to View B, or θ/3 with respect to View A. View D is rotated θ with respect to View A. Assigning a line-of-sight vantage point halfway between Views B and C makes these views the images that would be seen by a viewer's left eye and right eye at a second viewing position. Similarly, Views C and D are the images that would be seen by a viewer's left eye and right eye at a third viewing position.

Referring to FIG. 5, the parallax and image shift are shown by comparing View A and View B. More particularly, the image plane corresponding to View A is labeled Plane A, while Plane B is the image plane corresponding to View B. Also shown is Plane C corresponding to View C, and Plane D as the image plane for View D. In Plane A, relative to Object(KS), Object(1) is at location W, Object(2) is at location X, and Object (4) is at location Y. However, in Plane B, which corresponds to View B, Object(1) is at a location W' with respect to the key subject Object(KS), and Object(2) and Object(3) are at locations X' and Y', respectively. The shift between W and W' is the parallax between Object(1) and the key subject Object(KS) seen from View A compared to Object(1) in relation to Object(KS) when seen from View B.

Referring to FIG. 5, it is seen that the horizontal shift of Object(1) and Object(2), which are in the surfaces SIMG(a) and SIMG(2) in front of the key subject, are in one direction. The shift of Object(4), which is in the SIMG(4) plane background of the key subject, is in the opposite direction. FIG. 5 also shows a similar parallax, or shift, with respect to their position seen from View A, for each of the four Objects(n) when viewed from Views C and D.

Step 208 of FIG. 4 calculates the shift for the pixels of each Object(n) for each view using the basic theory illustrated by FIG. 5. It can be seen that the shift calculated by step 208 displaces all of the Objects(n) within each surface SIMG(s) by a horizontal distance corresponding to the distance, in a depth direction, that the objects within that surface should appear relative to the key subject plane SIMG(KS). The horizontal distance is called the "base linear pixel movement." The greater it is the more depth will appear between planes in the final viewed image. The horizontal shift is also referred to as "the parallax shift".

Referring to FIGS. 3 and 4, after the above-described step 208 calculates the parallax shift for each of the N Objects(n), the process goes to step 210, where image data representing each of the Objects(n), and the parallax shift for each corresponding to each view, is input to the DSP unit 20. At step 210 the DSP unit 20 performs image shifting in accordance with the parallax values determined at step 208, and then creates a vertical raster or line file for each viewing angle desired for the completed three-dimensional image. As described below, the plurality of line files is interphased into a single Line Formed File 102.

The above-described method for segregating Objects(n), assigning them to surfaces SIMG(s), and calculating rotation is not a limitation of the invention. One alternate method (not shown) is as follows:

a. Using Adobe Photoshop® or equivalent, select objects within the two-dimensional image on a display (not shown);

b. Use Photoshop® or equivalent to cut out specific objects;

c. Drop only the cut-out object onto a layer; and d. Use commercially available software to create a three dimensional image.

The above-described alternative also uses rotation of objects to create a three-dimensional effect, but the background and the objects are static and, therefore, less rounded.

Figures 6, 7:
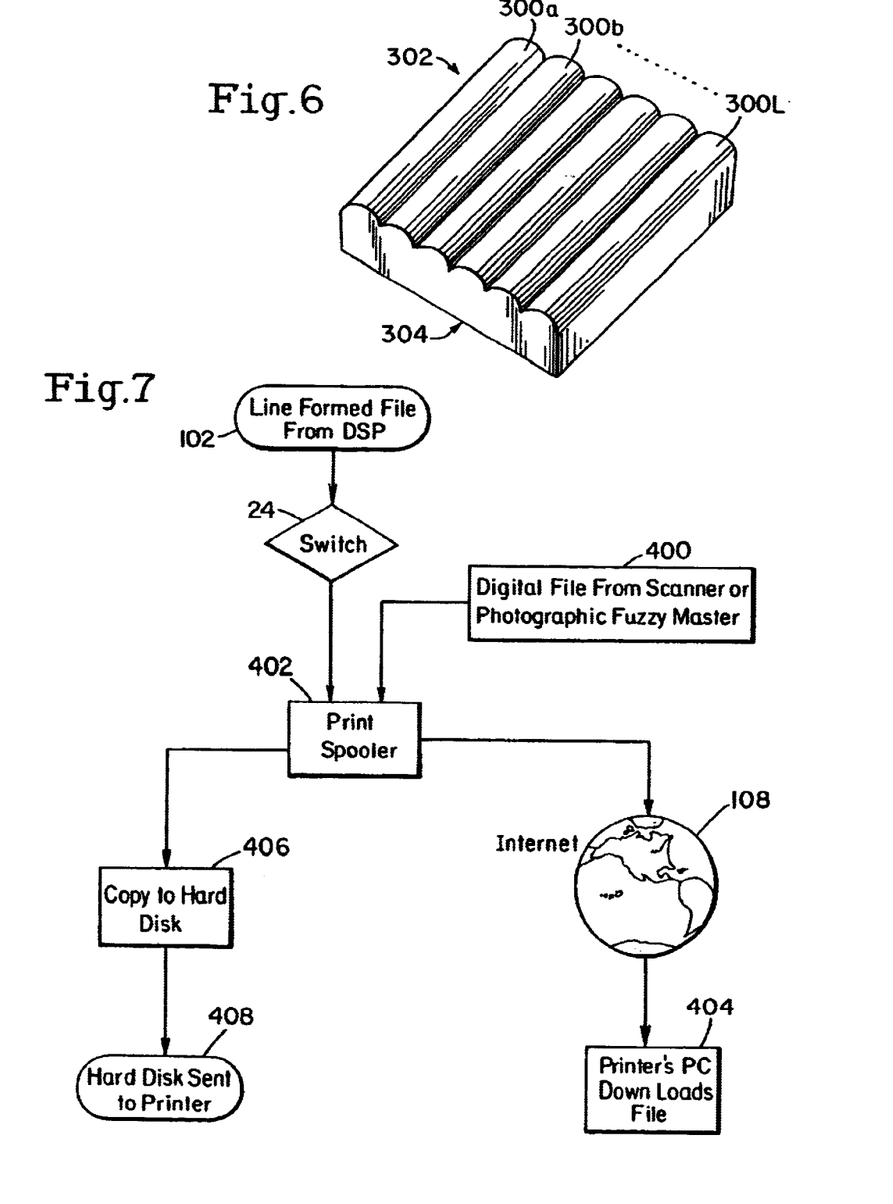
FIG. 6 shows an example Micro Optical Material (MOM) of the invention forming a longitudinal cylindrical lens array.
FIG. 7 is a block flow diagram of the print file transfer performed by the system of FIGS. 2 and 3.

Referring to FIG. 6, the number of lines forming each line file formed by step 210 is equal to the number L of cylindrical lenses 300 overlaying the ink layer or image surface 302 of the Micro Optical Material 304. The surface 302 is the surface on which the ink is placed, or to which a paper print of the Line Formed File 102 is laminated.

An example operation of step 210 of FIG. 4 will be described in reference to the four-view example of FIG. 5. The FIG. 5 example used four views, A, B, C and D. Accordingly, step 210 would create four raster-type or line files, one for each of the four views A, B, C and D. Referring to FIG. 6, each line file has L vertical lines, one for each of the cylindrical lenses 300 of FIG. 6. Each of the L vertical lines is one pixel wide. Referring to FIG. 3, after the four L-line files are created, they are merged, or interphased, into a single interphased Line Formed File 102.

Next, referring to the example system of FIG. 3, the Line Formed File 102 is either transferred for photographic output block 104 or to the digital printer block 106. An example operation of the digital printer block 104 will be described first, using the FIG. 5 example of four viewing angles.

For this example of digital printing, the Line Formed File 102 is printed directly, at step 108 of FIG. 3, on the back surface 304 of the MOM material 302 of FIG. 6. Since the FIG. 5 example has four viewing angles, each of the cylindrical lenses 300 would, for this example, have four vertical lines under it. More particularly, the first vertical line of the L-line files corresponding to views A, B, C, and D would be printed under the first cylindrical lens 300a of FIG. 6. The second vertical line of each of the L-line files would be printed under the second cylindrical lens 300b. The $L^{th}$ cylindrical lens 300L would have the last, or $L^{th}$ raster line of each of the four L-line files printed beneath it. The result is a direct MOM print 110.

Referring to FIG. 3, an alternative embodiment prints, at step 112, the Line Formed File 102 onto paper (not shown), instead of directly onto the back surface 304 of FIG. 6. After printing onto the paper, the paper is laminated, at step 114, to the back surface 304 of FIG. 6 to generate a laminated MOM print 116.

It should be noted that for the above-described printing operations the printing resources utilized by steps 106 through 116 are depicted as block 28 on the high-level system diagram of FIG. 2.

The above-described example printed the Line Formed File 102 at a location local to the DSP unit 20, as depicted by FIGS. 2 and 3. Referring to FIG. 7 a more detailed example of a variation of this print operation will be described. In FIG. 7 example, the Line Formed File 102 generated by step 210 of FIG. 4 is input to the switch 24 of FIG. 2. Next, the Line Formed File 102 is input to a Print Spooler 402. The Print Spooler 402 optionally outputs to a local hard disk 406, for later transfer to a printer at step 408, as was described in reference to FIG. 3. Alternatively, the Line Formed File 102 can be transferred, via the Internet 108 or other wide area network, for downloading by a professional printer's computer PC 404. Still further, as shown by block 400, instead of the Line Formed File 102 being obtained from directly from the ICSP 18 and DSP unit 20 as described above, a digital interphased line formed file (not numbered) can be created from a hard copy of a line formed interphased photographic image, also known as a "fuzzy raster" (not shown) by the following method: First, the fuzzy master is canned and digitized on, for example, a Crossfield™ or Scitex™ high resolution drum scanner. The DLFile is then a digital representation of the line formed interphased photographic image. This alternate method of file generation has the advantage of taking into account the apparitions of the MOM. However, the secondary scanning step is required.

Referring back to FIG. 3, in addition to printing the Line Formed File 102, the file can be converted to photographic negatives at step 104 and then, at step 118, converted to a raster print to generate a MOM photograph 120. The photographic output of steps 104, 118, and 120 is carried out by the photographic output resources 26 of FIG. 2.

Figure 8:
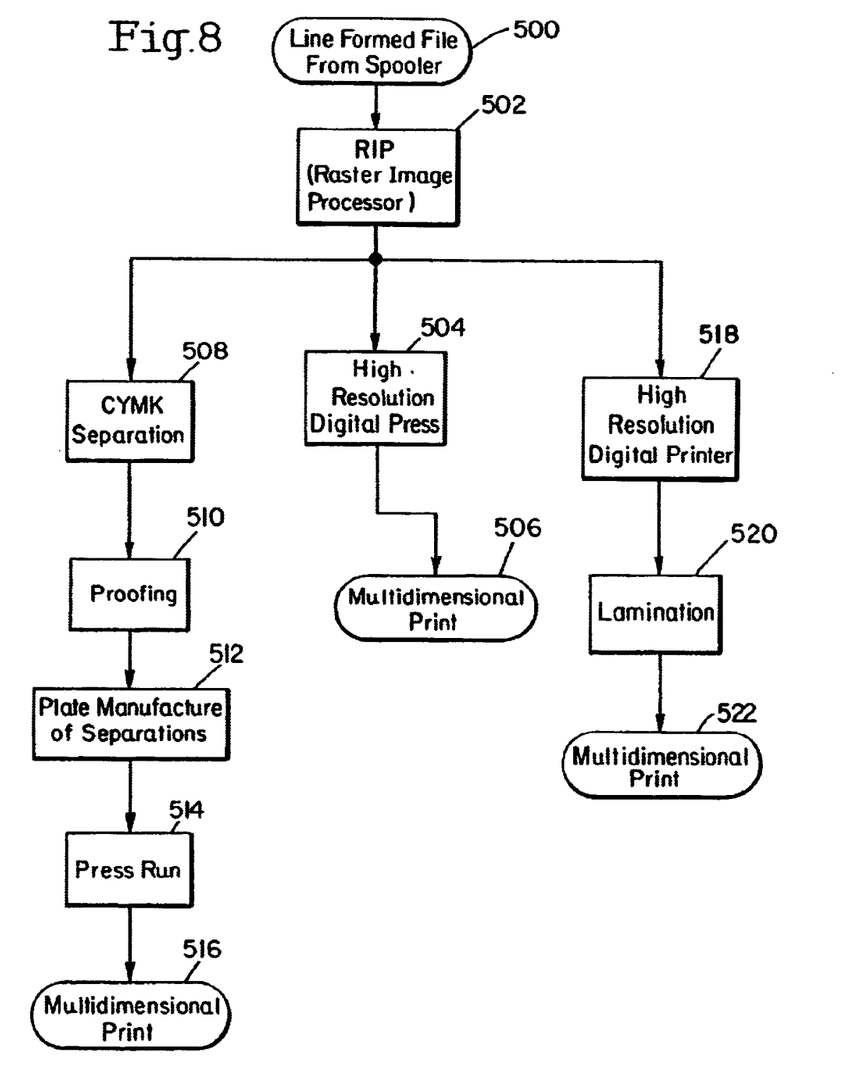
FIG. 8 is block flow diagram of example MOM printing operations performed by the system of FIGS. 2 and 3.

FIG. 8 depicts in greater detail an example embodiment of the Digital Printer 106 of FIG. 3, with the connected functions of direct print on MOM, shown as 108, and the print on paper and lamination steps 112 and 114. Block 500 of FIG. 8 represents the Line Formed File 102 output by the Print Spooler 402 of FIG. 7, after it is downloaded via the Internet 108 by the printer's PC 404, or after being received at the printer by hard disk, as shown at blocks 406 and 408 of FIG. 7. Referring to FIG. 8, the Raster Image Processor 502 reformats the spooled Line Formed File 500 into a format acceptable by subsequent printing blocks. There are three depicted means for printing the file output by the Raster Image Processor 502. One of the depicted means applies a CMYK separation at block 508, followed by a proofing step at block 510. If the proof obtained at block 510 is acceptable the next step 512 is a Plate Manufacture of Separations. Next a Press Run 514 generates a multidimensional print 516.

Another of the printing means depicted at FIG. 8 uses a High Resolution Digital Press 504 which generates a multidimensional print 506. Still another depicted printing means is a High Resolution Printer 518, which prints the processed line file onto paper or other inkable media. The printed paper or other inkable media is then laminated at step 520 to produce a laminated multidimensional print 522.

Referring to FIG. 6, the lamination step 520 of FIG. 8 affixes the printed paper or other inkable media to the back surface 2b of the MOM 2.

Figure 9:
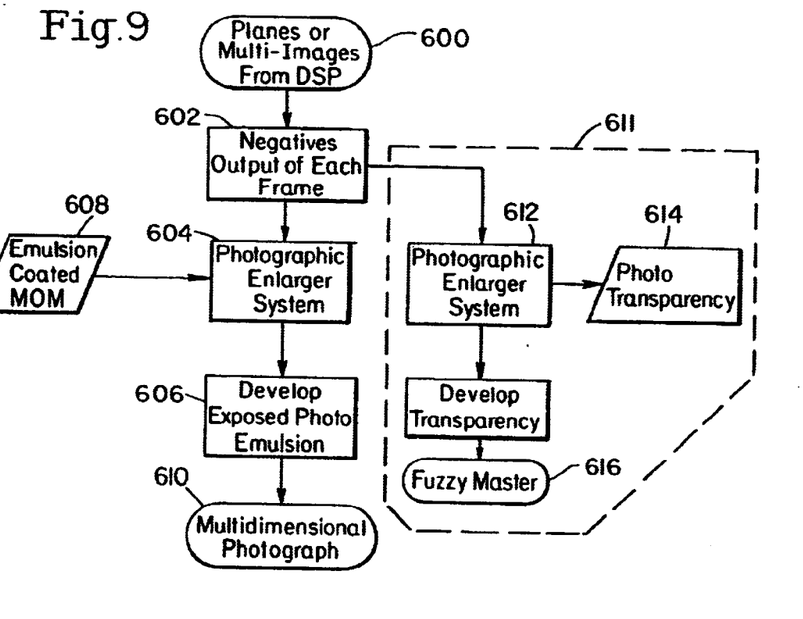
FIG. 9 is a block flow diagram of example photographic output operations of the system of FIGS. 2 and 3.

As shown at block 26 of FIG. 2, another output device contemplated by the system of this invention is a photographic output. FIG. 3 at blocks 104, 118 and 120 show a high level functional diagram of the printer output 26. Referring to FIG. 9, a detailed example of the photographic output blocks of FIGS. 2 and 3 will be described. First, at block 600 a Multi-Image File is received from the DSP unit 20. The Multi-Image File is a digital representation of information corresponding to each of the layers or planes of image with associated parallax shift as described in reference to FIG. 5 above. Next, step 602, a photographic negative is output for each frame, where "frame" means a layer or plane. The negatives generated by step 602, and a photographic emulsion coated MOM, shown as block 608, are input to the Photographic Enlarged System 604, which exposes the enlarged negatives onto the MOM. Next, at step 606, exposed photographic emulsion-coated MOM is developed to generate a multidimensional photograph 610.

Also shown at FIG. 9 is an optional digitizer system 611. The digitizer system 611 first, at step 612, enlarges the negatives from step 602 and then, at step 614, creates enlarged photo transparencies. Next, at step 615, the transparencies are developed. At step 616 the transparencies are scanned to form a fuzzy raster file which, in turn, becomes a Line Formed File 102. The term "fuzzy raster file" is used because the image appears fuzzy until being overlaid with a MOM, whereupon the three-dimensional or the flip, action, morph or zoom effect is presented to the viewer.

Figures 10, 11:
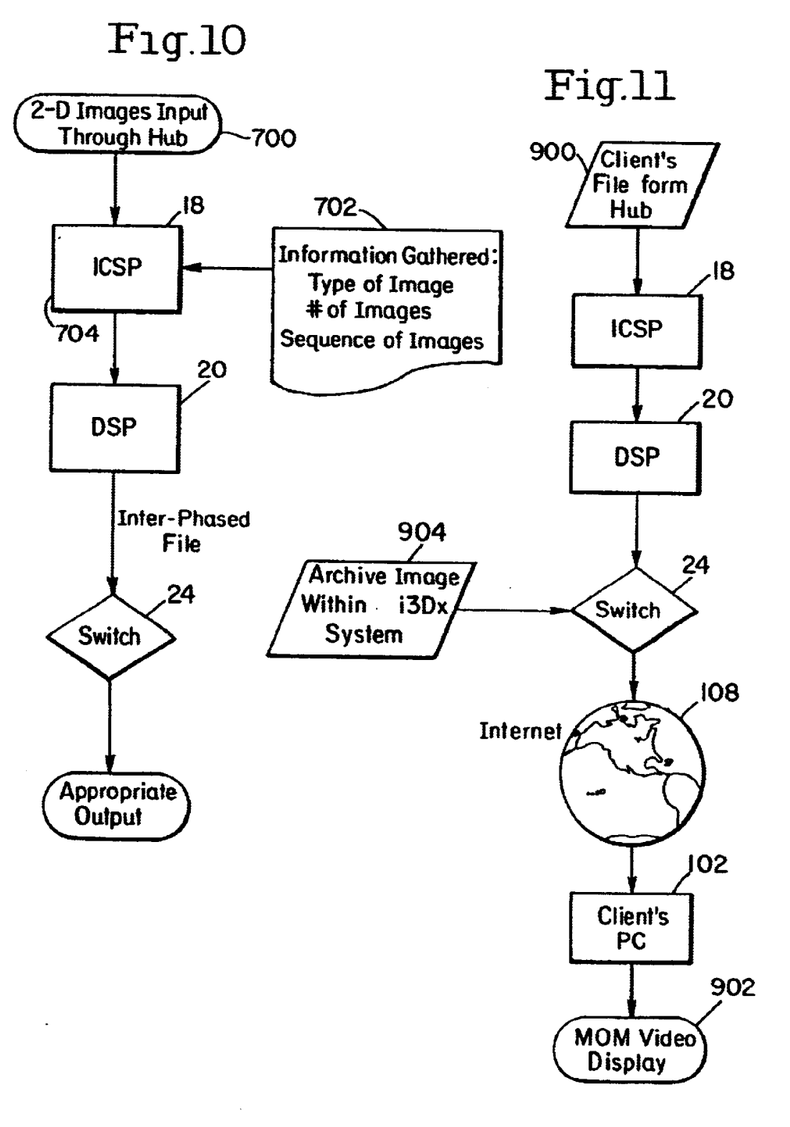
FIG. 10 is a block flow diagram of the morphing, zoom, action and flip images fixed on MOM by the system of FIGS. 2 and 3.
FIG. 11 is a block flow diagram of MOM video display operations performed by the system of FIGS. 2 and 3.

Referring to FIG. 10, still another embodiment of the present inventive system will be described. This embodiment receives at block 700, from the user terminal 2, a sequence of two-dimensional files 2DFILE described above, and inputs the sequence to the ICSP server 18. The ICSP server 18 also receives commands, from block 702, defining the types of images represented by the 2DFILE, the number of the images, and their relation as a sequence. Next, based on the commands received from block 702, the DSP unit 20 creates an L-line file for each image, and then interphases these into the Line Formed File 102 which is input to the Switch 24. If the command from 702 dictates a morphing sequence then the input sequence of files 2DFILE represent an image sequence with an object changing form from one image to the next. For example, the first 2DFILE could be an infant boy. The second 2DFILE could be a young adolescent, the third a middle aged man, and the fourth a frail elder man. The DSP unit 20 would then create four L-line files, one for each of the four images, and then interphase these into a single Line Formed File 102.

The output of Switch 24 is sent to an appropriate output 704, which is any of the output systems shown as blocks 26, 28, 30, and 32 of FIG. 2. These output systems can print the interphased image, or exposes it onto a photographic film, having a MOM overlay. For example, the Line Formed File 102 could be printed on paper which is then laminated to the back 304 of the MOM of FIG. 6, using the method of blocks 518, 520 and 522 of FIG. 8. Referring to FIG. 1B, such printing and lamination is performed such that when viewed from a first viewing angle, such as View A of FIG. 5, the viewer sees, for this morphing example, the infant boy. When the viewer rotates the FIG. 6 MOM 302 to a second viewing angle, such as View B of FIG. 5, the viewer sees the adolescent boy. Similarly, as the viewer rotates through views C and D of FIG. 5, he or she sees the middle age man appear and then change into an elder.

The sequence of images can be selected to show an abrupt change, from one form or position of an object to another, when the MOM is viewed from a sequence of angles. This is termed a "flip" image. Similarly, the sequence of images can be selected to show a progressive "zoom" on selected portions of the image when the MOM is viewed from a sequence of angles.

Figure 12:
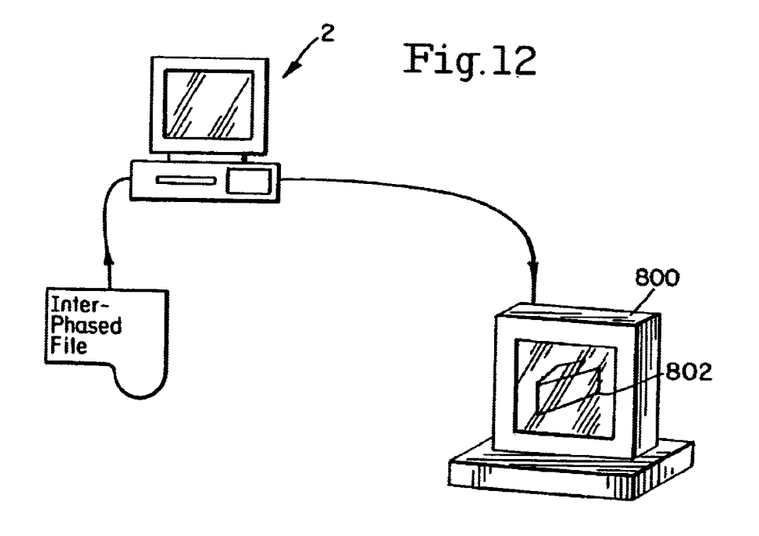
FIG. 12 shows an example MOM-overlaid CRT display for performing the video display of FIG. 11.

Referring to FIGS. 2 and 11 through 12 a still further example embodiment of the inventive system will be described. The video monitor example of FIGS. 11 and 12 is actually additional to the Video Monitor 32 of FIG. 2, as the FIG. 2 system locates the monitor local to the ICSP 18, while FIGS. 11 and 12 provide a for three-dimensional video display local to the client's terminal 2. More particularly, FIG. 11 shows a Client File 900 connecting to a hub local to the ICSP 18, which could be the hub 10 of FIG. 2. The Client File 900 contains one or more two-dimensional image files. The two-dimensional image files are transferred to the ICSP 18 and, using the methods described for the previous embodiments, converted by the ICSP 18 and DSP unit 20, into a plurality of line formed files, corresponding to surfaces of a three-dimensional image, or to sequential views for action, zoom, or morphing images. The Line Formed Files are downloaded through the switch 24 and Internet 108 to the clients PC 102. The files are then transferred, at step 902, to a MOM video display.

FIG. 12 shows an example MOM Video Display 800. The MOM Video Display comprises a high resolution flat screen CRT, having a MOM screen 802 attached. The operation of the MOM screen 802 is in accordance with that described in reference to FIG. 6, except that the face of the flat screen CRT is against the bottom surface 302 of the MOM sheet. FIG. 11 also shows an Archive Image 904 connecting to the hub 24. The Archive Image 904 can be a database of Line Formed Files previously generated by the ICSP 18 and DSP unit 20. An example Archive Image 904 includes a plurality of Line Formed Files, such as files 102, and, if desired, an associated plurality of two-dimensional files. The Line Formed Files and associated two-dimensional files could be, for example, a set of professional football players. For this example, the client could browse the two-dimensional files using, for example, the Internet Explorer® browser. When the client found a player of interest the client would, for example, click on the appropriate HTML hot button (not shown). The system would then download vie the Internet the associated Line Formed File for three-dimensional viewing on the MOM display 800.

The invention has been described with reference to example embodiments and, therefore, it should be understood that various substitutions, variations, and modifications may be made thereto without departing from the scope of the invention as defined in the appended claims.

Having thus described our invention, what we claim as new and desire to secure by Letters Patent is as follows:

1. A method for converting a two-dimension image to a three-dimensional image, comprising:

inputting a digital file representing a two-dimensional image of a plurality of visible objects into a digital computer;

segregating a first object image data, representing a first of said visible objects, and a second object image data, representing a second of said visible objects, from said digital file;

receiving a command data LPI representing a number of lenses per inch of a sheet having a plurality of longitudinal lenses;

assigning said first object image data to a first image depth plane of a plurality of image depth planes and said second object image data to a second image depth plane of said plurality of image depth planes, wherein said assigning of said first and second object image data to said first and second image depth plane, respectively, is based, at least in part, on said command data LPI;

generating a plurality of line images, each corresponding to a particular view angle, each line image defining a projection alignment, for said view angle, of said first object image data within said first image depth plane with respect to said second object image data within said second depth plane;

interphasing the line images into a merged line formed file;

transmitting the merged line formed file to an output device;

generating through said output device a visible form corresponding to said transmitted merged line formed file; and displaying said visible form through said sheet having a plurality of longitudinal lenses.

2. A method according to claim 1 further comprising receiving a command data S representing the number of said plurality of image depth planes.

3. A method according to claim 2 wherein said step of receiving a command data S includes a step of transferring said command data S over the Internet.

4. A method according to claim 1 wherein said step of receiving a command data LPI includes a step of transferring said command data LPI over the Internet.

5. A method according to claim 1 further comprising receiving a command data KS designating a key subject within the two-dimensional image, and wherein said assigning of said first and second object image data to said first and second image depth plane, respectively, is based, at least in part, on said command data KS.

6. A method according to claim 5 wherein said step of receiving a command data KS includes a step of transferring said command data KS over the Internet.

7. A method according to claim 1 wherein said displaying step comprises a step of printing the visible form onto a back surface of a said transparent sheet.

8. A method according to claim 1 wherein said displaying step comprises steps of:

printing the visible form onto a paper; and affixing said paper onto a back surface of a said transparent sheet.

9. A method according to claim 1 wherein said displaying step comprises a step of displaying an image on a visual display having said transparent sheet attached to a surface thereof.

10. A method according to claim 9 further comprising steps of:

storing a plurality of archival interphased data files in an archive database, each of said archival interphased data files representing multiple views of an associated image;

receiving a selection command at said archive database;

retrieving one or more of said archival interphased data files in response to said selection command; and transferring said one or more retrieved archival interphased data files to a client via the Internet, said client having a visual display screen with an overlaid transparent sheet having a plurality of longitudinal lenses; and displaying a visible image corresponding to said transferred archival interphased data files on said visual display.

11. A method according to claim 1 wherein said inputting of a digital file includes inputting said digital file into a network access computer connected to a wide area network, transferring said digital file over said wide area network, and inputting the transferred digital file into said digital computer.

* * * * *